United States Patent Office.

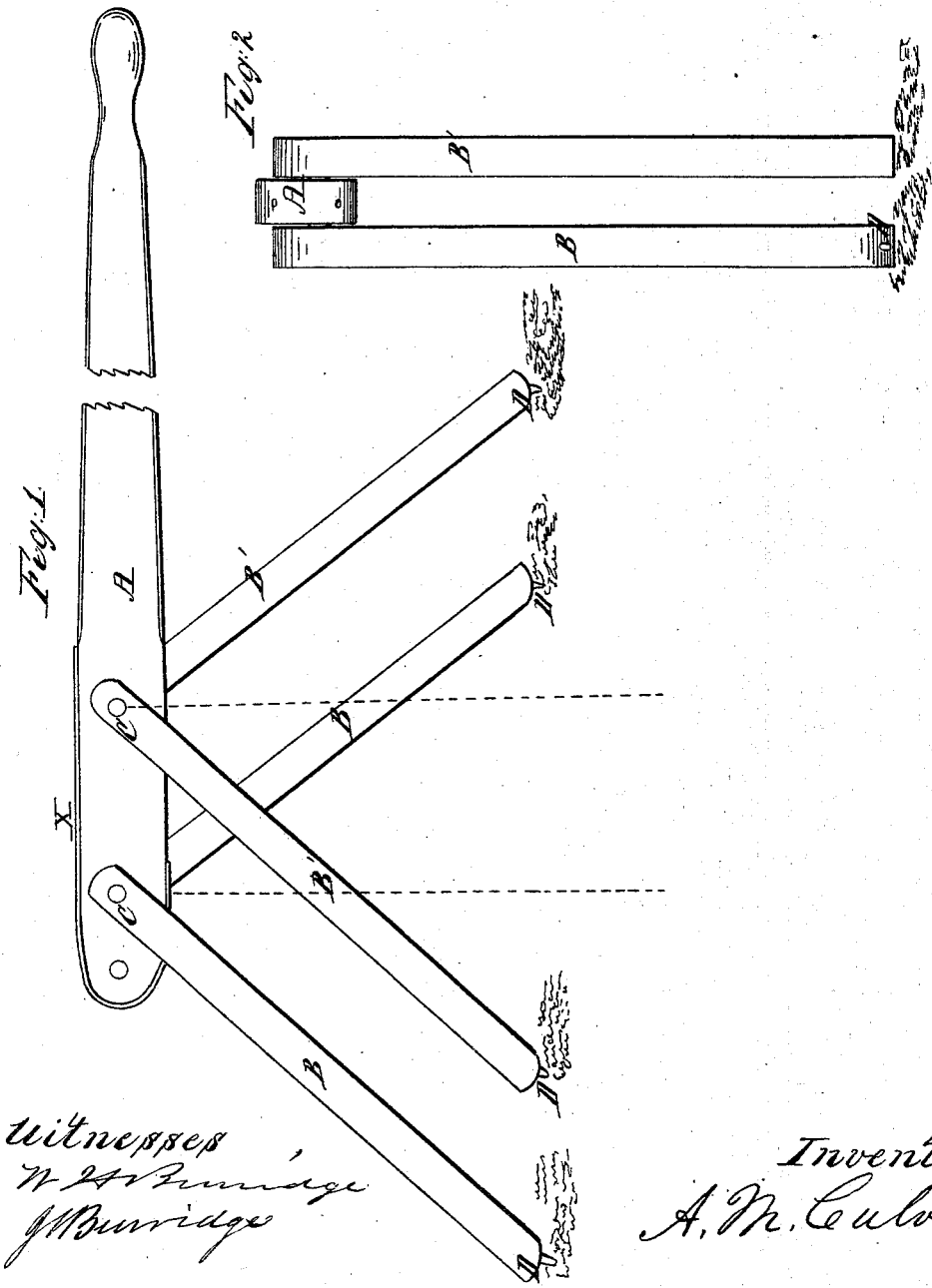

A. M. CULVER, OF BEDFORD, OHIO.

Letters Patent No. 62,117, dated February 19, 1867.

---

IMPROVEMENT IN LIFTING-JACK.

---

*The Schedule referred to in these Letters Patent and making part of the same.*

---

TO ALL WHOM IT MAY CONCERN:

Be it known that I, A. M. CULVER, of Bedford, in the county of Cuyahoga, and State of Ohio, have invented certain new and useful Inprovements in Lifting-Jacks; and I do hereby declare that the following is a full and complete description of the construction and operation of the same, reference being had to the accompanying drawings, making a part of this specification, in which—

Figure 1 is a side view of the jack.
Figure 2 is a front end view of the same.
Like letters of reference refer to like parts.

This jack consists of the beam or lever A, fig. 1, which may be of any convenient size and length, and of the shape expressed in the drawing. The edge of the larger end of the lever is faced with iron in order to prevent abrasion and to give additional strength to the end. B and B' are a pair of adjustable standards or legs pivoted to the lever at the point C, the lower end of which is armed with a sharp iron point, D, the purpose of which will be hereafter shown.

The manner of using this jack is as follows: It is placed under the axle near the wheel so that it may rest upon the section of the lever between the legs at the point $x$; the legs are then spread out as shown in the drawing; on raising up the long arm of the lever, the front legs B become the fulcrum of leverage; in consequence of this lifting up of the arm, the legs B' are brought or swung nearer together or towards a vertical position; on depressing the arm the legs B' become in turn the fulcrum, and legs B are thereby drawn together as were the legs B'; and so on alternately, at each reverse action of the lever, the legs approach each other and thus raise up the wheel until they obtain a vertical position, as shown in fig. 2 and the dotted lines fig. 1, in which position they support the axle and wheel thus raised. The points D referred to prevent the legs from slipping upon the ground when spread out for the purpose of lifting, and thereby giving greater security to the implement. In order to shift the jack the lever is depressed or raised, and the pair of legs, thus relieved of the weight of the axle and wheel, are drawn out from a vertical position and the wheel then comes to the ground. The construction of this jack is such as to adapt itself readily to any kind of wagon or carriage, to the front axle as well as to the hind one, and that without the necessity of removing any pin or bolts for the purpose of obtaining the proper height of the jack so that it may be placed under the axle.

What I claim as my improvement, and desire to secure by Letters Patent, is—

The arrangement of the legs B B', pivoted to and in combination with the lever A, in the manner and for the purpose described.

A. M. CULVER.

Witnesses:
   W. H. BURRIDGE,
   J. HOLMES.